Dec. 13, 1960  W. O. MARTIN  2,964,362
JOURNAL LUBRICATOR
Filed April 22, 1957  3 Sheets-Sheet 1
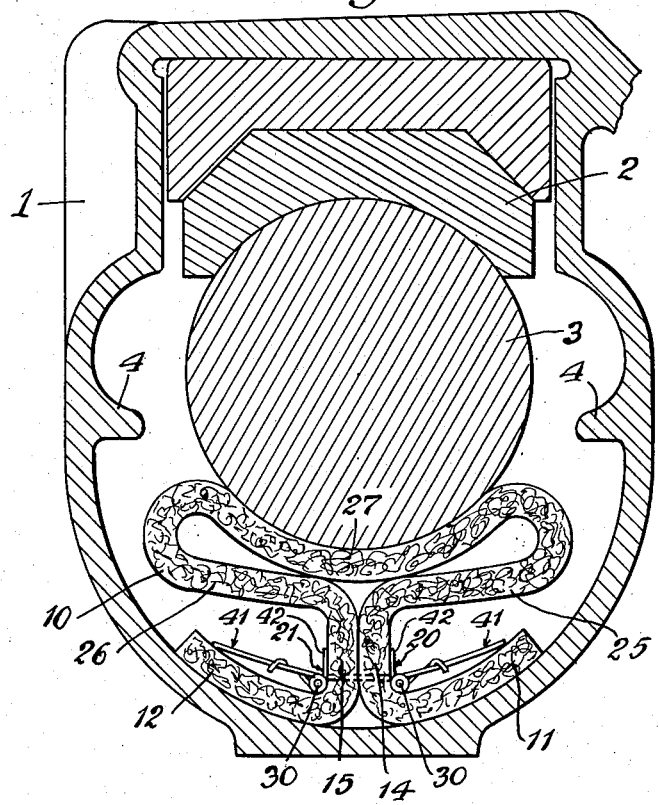
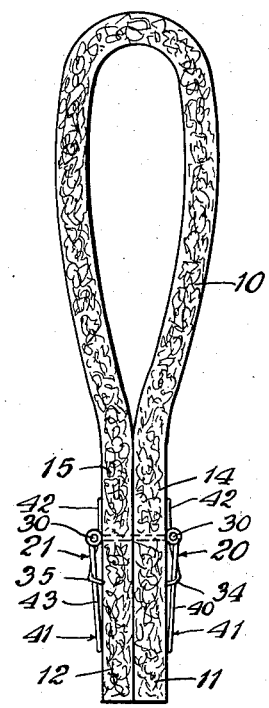
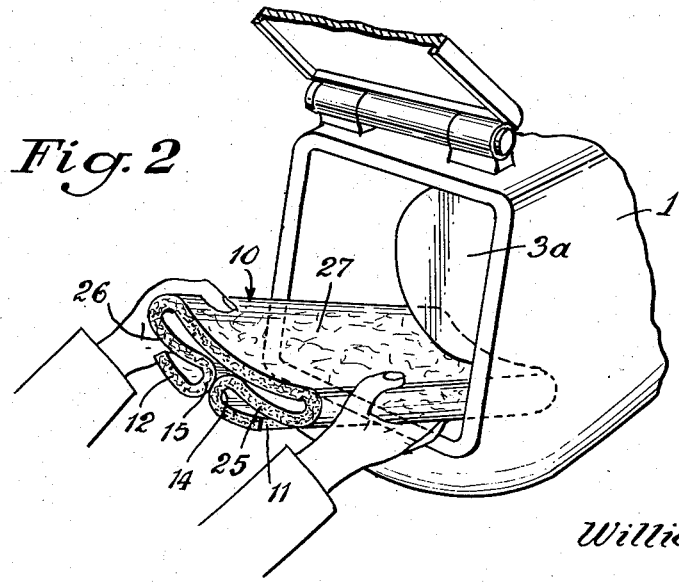
Inventor
William O. Martin
by Parker & Carter
Attorneys Dec. 13, 1960 W. O. MARTIN 2,964,362
JOURNAL LUBRICATOR
Filed April 22, 1957 3 Sheets-Sheet 2
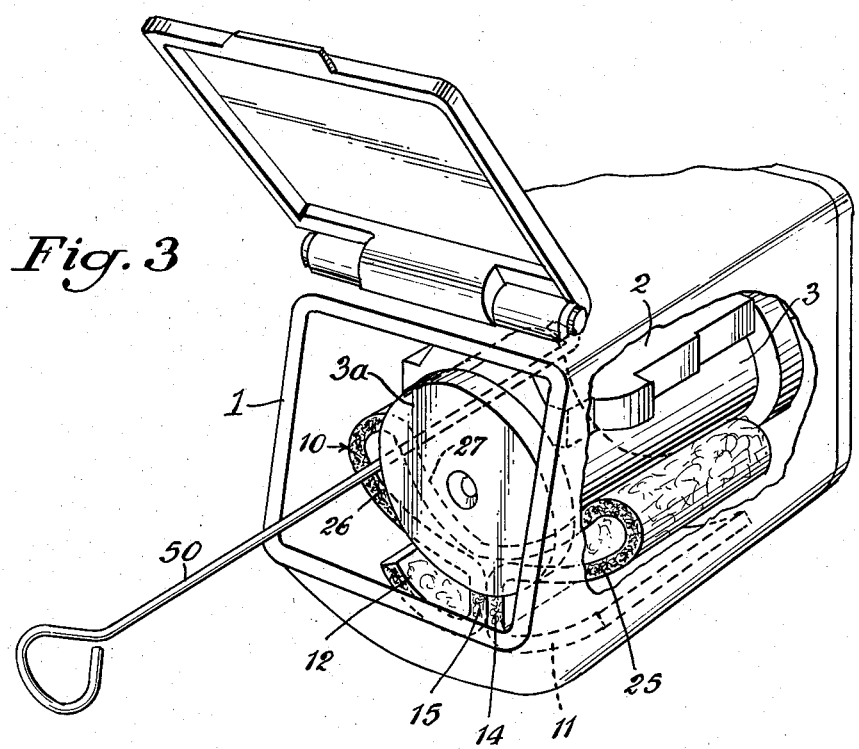
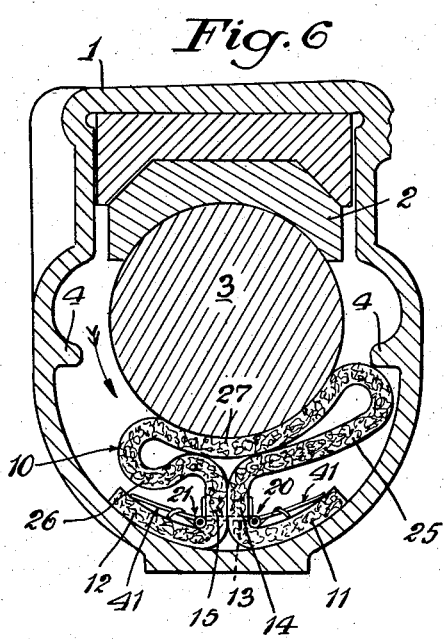
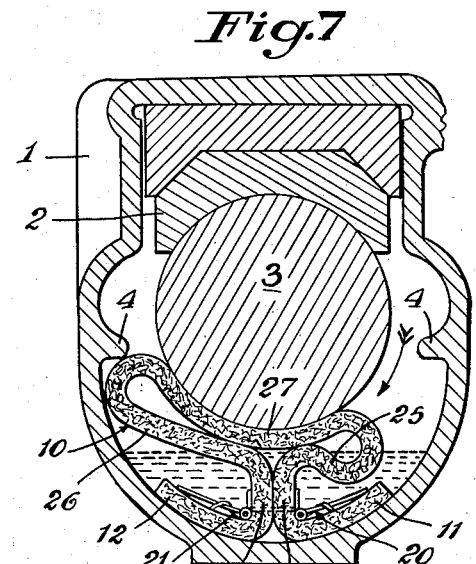
Inventor
William O. Martin
by Parker & Carter
Attorneys

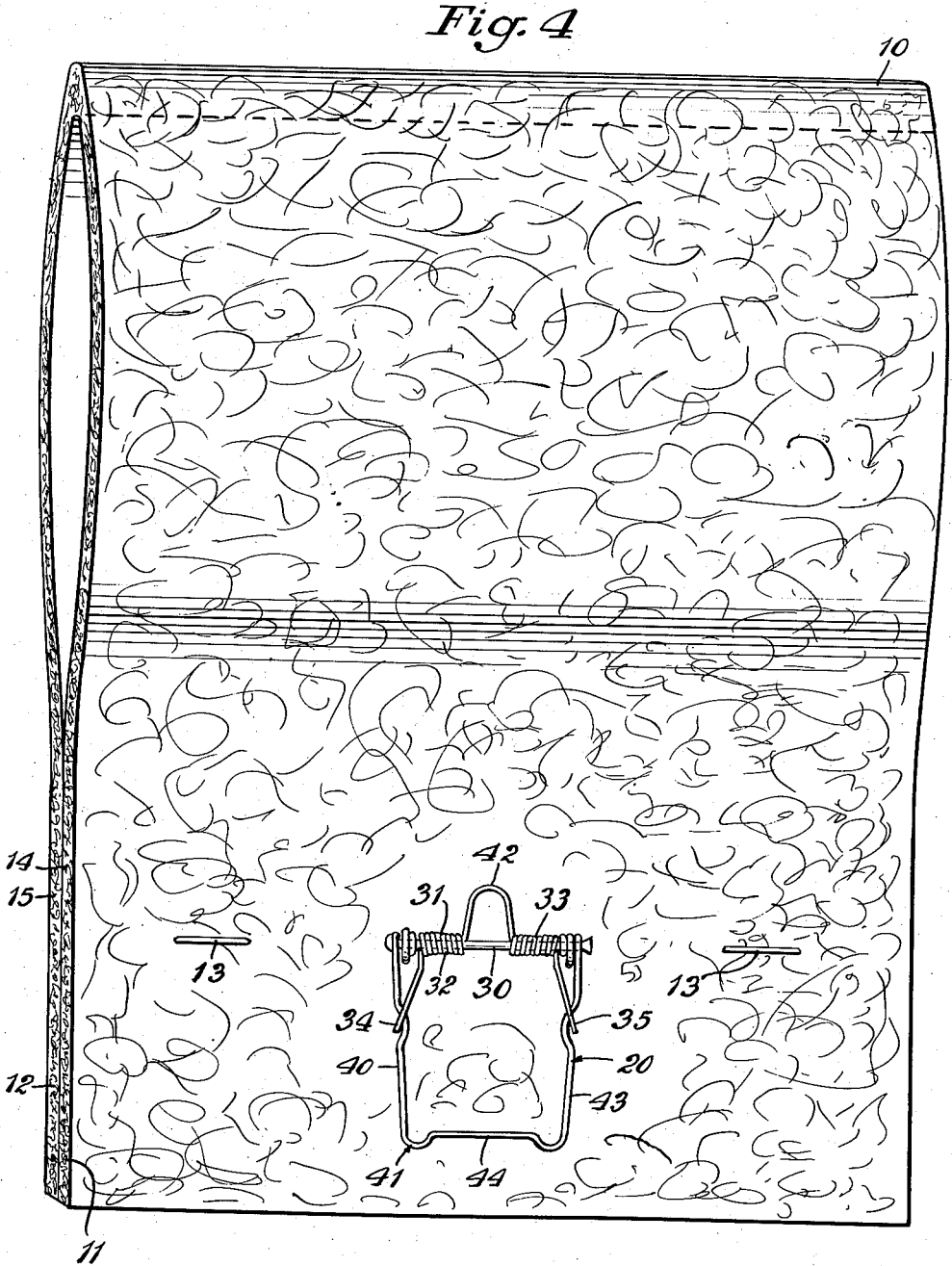

` # United States Patent Office 2,964,362
Patented Dec. 13, 1960

2,964,362

JOURNAL LUBRICATOR

William O. Martin, 822 S. 23rd St., Fort Smith, Ark.

Filed Apr. 22, 1957, Ser. No. 654,216

4 Claims. (Cl. 308—87)

This invention relates to lubricators adapted for use in railway car truck journal boxes and has particular relation to a means for supplying lubricant to the journals of truck axles within said boxes.

One purpose of the invention is to provide a lubricating device of maximum simplicity in manufacture, one having a minimum of parts and one which shall at the same time provide a maximum economy in manufacture and in use.

Another purpose is to provide a lubricating device which shall efficiently and effectively transfer oil from an oil reservoir, such as the bottom of a railway car journal box, to a journal rotating within such box.

Another purpose is to provide a lubricator, the function and long life of which will be aided rather than impeded by the environment in which such devices must operate.

Another purpose is to provide a railway car journal lubricator which may be easily and quickly installed in operative position and as easily and quickly removed therefrom without the necessity of having to remove a journal bearing or other parts.

Another purpose is to provide a journal lubricator which, because of its unique construction shall be effective to transfer oil from the bottom of the journal box to a rotating journal irrespective of the direction of rotation of the journal.

Another purpose is to provide a pad-type lubricator which will retain its life and resiliency over a long period of use.

Another purpose is to provide a journal lubricator which, because of its unique construction, shall be effective to transfer oil from the bottom of the journal box to a journal rotating within the journal box and which shall be free from glazing and from the formation of a film or surface destructive or preventive of lubricant.

Another purpose is to provide such a lubricator which, because of its structure, is caused to function in such manner as to preclude glazing and consequent destruction of its ability to transfer lubricant.

Another purpose is to provide a journal lubricating pad which, because of its unique construction, shall be effective to transfer oil from the bottom of the journal box to a journal rotating therewithin over a long period of time.

Another purpose is to provide a journal lubricating pad which, because of its construction, is free to assume a variety of conformations in response to rotation of a journal thereagainst.

Another purpose is to provide a journal lubricator whose function is not impeded by load, shock or variance in temperature.

Pads of wool or felt have been used as lubricators and the capillary or wicking action thereof is known. The inherent advantages of cost saving, simplicity, etc., of such pads have not been thus far achieved, however because, after very short periods in use, the surface of the pads would glaze over and the capillary or wicking action be destroyed. In addition various structures employed in supporting such pads have been subject to the effects of vibration and along with the pads to the effects of temperature. It is accordingly another purpose of my invention to provide a lubricator which shall avoid these difficulties while retaining the advantages mentioned above.

Other purposes will appear from time to time during the course of the specification and claims.

I illustrate my invention more or less diagrammatically in the accompanying drawings wherein:

Figure 1 is an end view in partial cross section and illustrating the device of my invention installed within a journal box.

Figure 2 is a detail view illustrating the method of installing the device of my invention.

Figure 3 is a perspective view illustrating the device of my invention installed within the journal box and illustrating a method of removal of the device from the journal box.

Figure 4 is a perspective view of my device in its normal, free, non-installed state.

Figure 5 is an end view of my device in its normal, free, non-installed state.

Figure 6 is a detail view showing the pad of my invention in one operative position.

Figure 7 is a detail view showing the pad of my invention in another operative position.

Like parts are indicated by like numerals throughout the specification and drawings.

Referring now to the drawings and particularly to Fig. 1, the numeral 1 indicates generally a railway car truck journal box. 2 is a journal bearing within the box 1, formed and adapted to seat upon a journal or axle portion 3 within the box 1. The numeral 4 indicates a pair of inwardly directed parallel ribs, one along each side wall of the box 1. It will be realized that journal boxes of the type illustrated in Fig. 1 may or may not include the ribs 4. As will be later discussed, the box illustrated in Fig. 3 for example does not incorporate the ribs 4.

Continuing to refer to Fig. 1, the lubricating device of my invention is illustrated therein in cross section. The numeral 10 indicates generally the lubricator of my invention. As may be best seen in Figs. 4 and 5, the lubricator 10 consists primarily of a single piece or rectilinear strip of material capable of capillary action. I may, for example, employ an all wool material or felt. The strip 10 may be considered as having a pair of end portions 11, 12. The strip 10 is folded to bring the ends 11, 12 evenly together. At a point spaced inwardly from the end edges of the portions 11, 12, the same are secured one to the other. I prefer, for example, to use a sufficient number of staples for this purpose spaced along a line paralleling the end edges of the strip 10. While it will be understood that the ends might be sewn or otherwise bound together at the same point, I find staples preferable since a tendency exists for capillary action to be impeded by a sewn seam. The portions of the pad 10 adjacent to the line of staples 13 and beyond the same from the edge portions 11, 12, may be indicated by the numerals 14, 15.

In alignment with the line of staples 13 a pair of opposed elements 20, 21 are secured one on each of the outer surfaces of the pad 10. The elements 20, 21 will be further described hereinbelow.

Referring again to Fig. 1, and considering the structure of my invention in its installed state, it will be observed that the end portions 11, 12 are bent outwardly in opposite directions to lie along the bottom wall of the journal box 1. The adjacent pad portions 14, 15 rise upwardly, substantially vertically from the portions 11, 12 at a point substantially centrally of the journal box 1. The pad then includes oppositely directed or bent portions 25, 26 which may be considered as being turned or bent inwardly again upon themselves to form the central, journal-contacting portion 27. For convenience, the outwardly directed portions 11, 12 may be considered as comprising a first fold in the pad 10. The oppositely directed portions 25, 26 may similarly be considered as forming a second fold in the pad 10 and the portion 27, curved by axle 3, may be considered as forming a third fold.

As best seen in Fig. 4, the elements 20, 21 serve to aid the pad of my invention in pressing itself against the journal 3. For convenience, since the elements 20, 21 are identical, the element 20 may be described, it being understood that the descritpion of the element 20 applies equally to the element 21.

The element 20 may comprise a fixed shaft or staple member 30, about which a spring member 31 has portion 32, 33 coiled. The spring 31 has an end portion 34 extending outwardly from the shaft 30 and engaging an arm 40 of a jaw member indicated generally as 41. The spring 31 has a central loop portion 42 serving to join the spaced coiled spring portions 32, 33 and positioned centrally therebetween. The loop portion 42 extends upwardly from the shaft 30 in the direction opposite from that of the jaw element 41 and bears against the outer surface of pad section 14. The opposite end portion 35 of the spring 31 similarly engages an arm 43 of the jaw member 41. The jaw member 41 may include a cross portion 44 joining the arms 40, 43 at their outer extremities, it being understood that the jaw member 41 is pivotally mounted on the shaft 30.

It will be observed that the loop portion 42 of the spring 31 extends to a point above the center line of the staples 13 and the frame or jaw 41 extends to a point substantially below this centerline, as the parts are shown in Fig. 4. It will be further observed that the spring ends 34, 35 press against the jaw 41 to urge the same against the outer surface of the end portion 11. Thus the jaws of the elements 20, 21 are urged toward each other to keep the two ends 11, 12 of the pad together when the pad 10 is in its free, not-installed state.

Referring now to Fig. 2, it will be understood that the device of my invention may be simply and easily installed. The operator presses downwardly upon what may be considered as a top portion 27, preferably with the thumbs. The end portions 11, 12 are folded outwardly in opposite directions against the action of springs 31 and jaws 41, and the pad 10 is held in the position or conformation shown in Fig. 2. The pad is then easily and simply inserted in the open end of the journal box 1 beneath the collar 3a of the journal 3 and then beneath the journal between the collar 3a and the inner end wall of the journal box 1. The operator then simply releases the lubricator and it is in position to function. Removal of the lubricator is similarly accomplished without difficulty. One method is illustrated, for example, in Fig. 3. The operator may insert a packing hook, such as that illustrated at 50 in Fig. 3, through either opposite loop formed by the portions 25, 27 or 26, 27 of the pad 10, to engage the rear edge of the pad 10 with the hook portion of the tool 50. The outer handle portion of the tool 50 may then be withdrawn while the forward edge of the pad 10 and particularly portion 27 thereof is forced down by the operator to clear the collar 3a of the journal 3.

It will be observed that each of the jaws 41 of the members 20, 21, when the lubricator of my invention is installed, is directed in a path or plane substantially 90 degrees from that occupied by the adjacent loop portion 42 of the springs 31, thus creating a tension on the two sides of the lubricating medium or pad 10. It will further be observed that the combined length of each jaw 41 and the thickness of the portions 25, 27 or 26, 27 is greater than the distance from the lowermost outer surface of the journal 3 to the inner surface of the bottom wall of the journal box 1. Thus it is impossible to install the lubricator of my invention in a journal box unless the jaws of the spring arrangement 20, 21 are directed outwardly at an angle from the loops 42 thereof. After installation, the jaws 41 continue to be urged toward each other and, in their efforts to return, for example, to the position illustrated in Figs. 4 and 5, they exert a force against the pad of my invention to urge the same upwardly toward the journal and to maintain the same against the journal regardless of the position of the pad 10 inside the journal box and regardless of the direction of rotation of the journal. The oil in the bottom of the journal box enters the material of the pad 10 and, through capillary action, rises through the portions 14, 15. Since the portion 27 is held in contact with the bends at the point of junctures of the pad portions 14, 25 and 15, 26, a direct capillary action takes place to transfer oil directly into the pad portion 27. In addition, oil travels through the portions 25, 26 to reach the portion 27. The rotating journal, as may readily be understood, wipes the oil off the lubricating device 10 and particularly off portion 27 thereof.

As best seen perhaps in Fig. 3, I find it preferable to form the device 10 of a single strip of rectangularly shaped felt, having a width a little less than the length of the journal to be lubricated. When installed the pad 10, as described above, assumes a conformation or configuration incorporating three "folds" in such manner as to permit the shimmering or gliding of each fold essentially independently of the other folds. As a result therefore of the vibration and vertical as well as the lateral and longitudinal movement of the car axle or journal 3, the top fold of the pad 10, indicated generally by numeral 27, is caused to move constantly in response to movement of the axle sufficiently to keep the felt of the pad 10 continuously activated and thereby to prevent undesirable glazing of the surface of the pad 10 in contact with the rotating journal. Further, it will be observed that the shocks, vibrations, etc., produced by movement of the car are absorbed by the resilient pad 10 and are not transferred to the elements 20, 21.

Similarly, the pad 10 particularly portion 27 thereof, as installed, is free to "float" within the journal box 1 in response to rotation of the journal or axle 3 in either dierction. As shown in Fig. 1, when the journal box includes the ribs 4, one or the other of the ribs 4 is effective to limit movement of portion 27 of the pad 10 within the box 1 in response to rotation of the journal. The same function is accomplished by the bearing in a journal box such as that shown in Fig. 3. For the action of the pad 10 and particularly of the upper journal contacting portion 27 thereof caused by the rotation of the journal 3, attention is respectfully invited to the showing of Figs. 6 and 7. It should be noted that the end portions 11, 12 and adjacent portions 14, 15 of the pad 10 remain substantially in their centralized position. Rotation of the journal 3 therefore causes a distortion of the pad 10 out of its basic installed position such as that shown in Figs. 1 and 3, thus causing the pad to "roll" in the direction of rotation. As a result oil is delivered to the journal high up on the side nearest the bearing in the direction the axle is rotating. In addition, the opposite end of the pad portion 27 and the adjacent portion 25 or 26 is moved into position substantially beneath the rotating journal and closer to the bottom of the journal box in which the oil supply is maintained. Thus a greater extension of the pad 10 is submerged and brought into contact with the supply of oil or lubricant and the distance over which the oil must be transferred by capillary attraction is accordingly reduced. The upper fold or portion 27 of the pad 10, being the journal-contacting portion, is the portion most subject to glazing. The virtually constant movement of the fold 27 in the manner described herein produces the freedom from glazing of the pad 10 and thus effectuates its long life of use.

It will be realized that, whereas I have described and illustrated a practical and operative device, nevertheless many changes may be made in the size, shape, number and disposition of parts without departing from the spirit of my invention. I therefore wish my description and drawings to be taken as, in a broad sense, illustrative or diagrammatic, rather than as limiting me to my precise showing.

I claim:

1. For use in a journal box having a journal rotatably extending therewithin and a supply of lubricant in the bottom thereof, a journal lubricator comprising a pad of lubricant-conducting material, said pad, when installed in said box, having a pair of end portions positioned on the bottom of said box and extending in opposite directions therealong, said end portions continuing in a pair of upstanding portions secured together, said upstanding portions continuing in a pair of spaced, flexible loop portions, said loop portions being joined by an integral, journal-contacting, generally central portion, yielding means secured to said pad and positioned to urge said end portions toward each other and thus to maintain contact of said upstanding portions with said central portion and contact of said journal-contacting portion with said journal while permitting said journal contacting portion to move in response to relative movement of said journal in said box and in response to rotation of said journal, irrespective of the direction of rotation of said journal.

2. For use in a journal box having a supply of lubricant in the bottom thereof and a journal rotatably extending therewithin, a journal lubricator comprising a pad of lubricant-conducting material, said pad having a journal contacting portion bounded by a pair of spaced, flexible loop portions generally paralleling said journal when said pad is installed within the journal box, said loop portions being distortable to permit the rolling of said pad in response to rotation of said journal in either direction, said loop portions contining in a pair of vertical portions, said vertical portions each terminating in an end portion positioned to seat upon the bottom of said journal box and yielding means secured to said pad and positioned to urge said end portions toward each other and to urge said vertical portions into contact with said journal contacting portion.

3. For use in a journal box having a journal rotatably extending therewithin, a journal lubricator comprising a pad of material folded upon itself to form a loop, said loop being dimensioned to cause distortion thereof when said paid is installed within said box between the bottom thereof and said journal, said distortion being such as to form in said pad a generally concave journal-contacting portion bounded by a pair of parallel flexible loop portions extending laterally of said pad and paralleling said journal, said flexible loop portions continuing in a pair of juxtaposed vertical portions, said vertical portions terminating in oppositely directed end portions positioned to seat upon the bottom of said box and yielding means secured to said pad and positioned to urge said end portions toward each other.

4. A journal lubricator comprising a pad of lubricant-conducting material, said pad, when in operating position, having a pair of end portions extending in opposite directions, said end portions continuing in a pair of adjacent, central upstanding portions secured together, said upstanding portions continuing in a pair of spaced, flexible loop portions, said loop portions being joined by an integral journal-contacting, generally central portion and yielding means secured to said pad and having portions yieldingly urged against said end portions and said upstanding portions and positioned to urge said end portions toward each other and to urge said central upstanding portions into contact with said journal contacting portion.

References Cited in the file of this patent

UNITED STATES PATENTS

| | | |
|---|---|---|
| 307,467 | Johnson et al. | Nov. 4, 1884 |
| 325,966 | Pierce | Sept. 8, 1885 |
| 392,845 | Bird | Nov. 13, 1888 |
| 485,219 | Peckham | Nov. 1, 1892 |
| 532,485 | Pugh | Jan. 15, 1895 |
| 2,013,357 | Miller | Sept. 3, 1935 |
| 2,079,734 | Ditmore | May 11, 1937 |
| 2,213,001 | Gundel | Aug. 27, 1940 |
| 2,571,235 | Hamer | Oct. 16, 1951 |